United States Patent [19]

Peck

[11] Patent Number: 4,514,540

[45] Date of Patent: Apr. 30, 1985

[54] WATER REDUCIBLE POLYAMIDES

[75] Inventor: Michael C. Peck, Savannah, Ga.

[73] Assignee: Union Camp Corporation, Wayne, N.J.

[21] Appl. No.: 535,635

[22] Filed: Sep. 26, 1983

[51] Int. Cl.³ .................. C09D 3/70; C09D 11/10
[52] U.S. Cl. .................. 524/514; 106/20;
106/27; 106/30; 260/DIG. 38; 523/160;
523/161; 524/503; 524/529; 525/59; 525/297;
525/301.5; 528/295.3; 528/295.5; 528/339.5
[58] Field of Search ........... 528/295.3, 295.5, 339.5;
260/DIG. 38; 523/160, 161; 106/20, 27, 30;
525/59, 301.5, 297; 524/503, 514, 529

[56] References Cited

U.S. PATENT DOCUMENTS

| | | | |
|---|---|---|---|
| 2,889,292 | 6/1959 | Peerman | 528/295.3 |
| 3,355,409 | 11/1967 | Bissot | 525/58 |
| 3,377,303 | 4/1968 | Peerman et al. | 528/341 |
| 3,412,115 | 11/1968 | Floyd et al. | 106/20 |
| 3,484,339 | 12/1969 | Caldwell | 524/39 |
| 3,660,329 | 5/1972 | Wysocki | 260/DIG. 38 |
| 3,753,968 | 8/1973 | Ward | 260/97.5 |
| 3,776,865 | 12/1973 | Glaser et al. | 106/27 |
| 3,778,394 | 12/1973 | Lovald et al. | 106/27 |
| 3,844,991 | 10/1974 | Ferraro et al. | 528/310 |
| 3,882,090 | 5/1975 | Fagerburg et al. | 528/339 |
| 3,945,983 | 3/1976 | Hoppe et al. | 528/342 |
| 4,089,832 | 5/1978 | Yamauchi et al. | 524/503 |
| 4,360,640 | 11/1982 | Tobias | 524/529 |
| 4,365,041 | 12/1982 | Okamoto et al. | 525/58 |

FOREIGN PATENT DOCUMENTS

| | | | |
|---|---|---|---|
| 142557 | 7/1980 | German Democratic Rep. | 260/DIG. 38 |
| 54-135029 | 10/1979 | Japan | 525/59 |

Primary Examiner—Ronald W. Griffin
Attorney, Agent, or Firm—Kane, Dalsimer, Kane, Sullivan and Kurucz

[57] ABSTRACT

The disclosure is of a copolymer reaction product of
(A) 20 to 60 equivalent percent of a polymeric fatty acid;
(B) 0 to 60 equivalent percent of a dicarboxylic acid;
(C) 15 to 50 equivalent percent of a monocarboxylic acid; and
(D) 5 to 25 equivalent percent of a synthetic polymeric resin having a crystalline chain structure, said resin having active carboxyl and/or hydroxyl groups capable of reaction with acid/amine groups; with
(E) 50 to 80 equivalent percent of an organic polyamine.

The copolymer is useful in flexographic ink compositions and such are advantageously water reducible (thinnable).

5 Claims, No Drawings

WATER REDUCIBLE POLYAMIDES

BACKGROUND OF THE INVENTION

1. Field of the Invention

The invention relates to polyamides and more particularly relates to water thinnable polyamide compositions useful as components of aqueous printing ink compositions.

2. Brief Description of the Prior Art

Polyamide resins which are useful in aqueous ink compositions have been described in the prior art literature; see for example the descriptions given in the U.S. Pat. Nos. 3,355,409; 3,776,865; 3,778,394; 3,844,991; 3,882,090; 3,945,983; and 4,365,041. In spite of the wide variety of polyamide containing, aqueous ink compositions known through the prior art descriptions, there has remained a need for improved polyamide resin components and ink compositions.

We have developed a new water reducible (thinnable) polyamide resin composition for use in aqueous flexographic inks. Such inks are useful for aqueous flexographic printing of polyethylene and polypropylene packaging films. The major advantage of the polyamide of the invention is that it will allow preparation of inks containing water as a significant replacement for the organic solvent (alcohols, hydrocarbons etc). presently required to dissolve conventional polyamides used in non-aqueous flexographic printing. Such waterborne ink will assist printers in complying with solvent emission standards (1970 Clean Air Act) as well as reducing solvent costs. In addition water is readily available, is non-toxic, and non-flammable.

Such waterborne inks will also retain the gloss, color strength, flexibility, adhesion and anti-blocking properties common to non-aqueous polyamide inks on preferred substrates such as polyethylene and polypropylene.

SUMMARY OF THE INVENTION

The invention comprises the copolymer reaction product of
- (A) 20 to 60 equivalent percent of a polymeric fatty acid;
- (B) 0 to 60 equivalent percent of polycarboxylic acid selected from the group consisting of a tricarboxylic acid and a dicarboxylic acid;
- (C) 15 to 50 equivalent percent of a monocarboxylic acid; and
- (D) 5 to 25 equivalent percent of a synthetic polymeric resin having a crystalline chain structure, said resin having active carboxyl and/or hydroxyl groups capable of reaction with acid/amine groups; with
- (E) 50 to 80 equivalent percent of an organic polyamine.

The copolymers of the invention are useful as the resin component of water reducible (thinnable) printing ink compositions and the invention includes such printing ink compositions.

DETAILED DESCRIPTION OF THE PREFERRED EMBODIMENTS OF THE INVENTION

The reactants employed to prepare the polyamide copolymer compositions of the invention are all well known as are the methods of their preparation. The polymeric fatty acids, sometimes referred to in the art as "dimer acids", are complex mixtures resulting from the polymerization of fatty acids. Representative of polymeric fatty acids are those commercially available from the polymerization of tall oil fatty acids. These polymeric fatty acids have a typical composition as follows:

|  | % BY WEIGHT |
| --- | --- |
| $C_{18}$ monobasic acids (monomer) | 0–5 |
| $C_{36}$ dibasic acids (dimer) | 60–95 |
| $C_{54}$ and higher polybasic acids (trimer) | 1–35 |

The relative ratios of monomer, dimer and trimer in unfractionated polymeric fatty acids are dependent on the nature of the starting material and the conditions of polymerization. Methods for the polymerization of fatty acids are described, for example, in the U.S. Pat. No. 3,157,681.

A wide variety of polycarboxylic acids may be employed in the preparation of the compositions of the invention, including aliphatic, cycloaliphatic and aromatic dicarboxylic acids. Representative of such acids, which may contain from 2 to 25 carbon atoms, are fumaric, oxalic, glutaric, malonic, adipic, succinic, suberic, sebacic, azelaic, pimelic, terephthalic, isophthalic, phthalic, trimellitic, pyromellitic, napthalene dicarboxylic acids and 1,4- or 1,3-cyclohexane dicarboxylic acids and the like. Methods of preparing these preferred acids are well known, and they are readily available commercially.

Preferred dicarboxylic acids employed in the invention are straight chain aliphatic diacids having at least 6 carbon atoms and more preferably 6 to 12 carbon atoms such as adipic and azelaic acids and $C_{21}$ cycloaliphatic dicarboxylic acids of the formula:

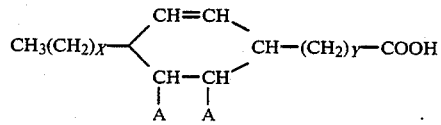

wherein X and Y are integers from 3 to 9, inclusive, and X and Y together equal 12. A is a member of the group consisting of hydrogen and —COOH with A being one of each moiety.

The $C_{21}$ cycloaliphatic diacid is obtained from the Diels-Alder reaction of linoleic and acrylic acids as described in U.S. Pat. No. 3,753,968 or British Pat. No. 1,032,363. It should be understood that use of the corresponding acid anhydride esters, and acid chlorides of these acids is included in the term "dicarboxylic acid".

A wide variety of monocarboxylic acids may also be used in the preparation of the polyamide compositions of the invention. Representative of such monocarboxylic acids are those of the formula:

R—COOH (I)

wherein R is selected from the group consisting of alkyl, cycloalkyl and aryl.

The term "alkyl" as used herein means the monovalent moiety obtained upon removal of a single hydrogen atom from a hydrocarbon. Representative of alkyl having at least 1 to 24 carbon atoms is methyl, ethyl, propyl, butyl, pentyl, hexyl, heptyl, octyl, nonyt, decyl, undecyl, dodecyl, tridecyl, tetradecyl, pentadecyl, heptadecyl, octadecyl, nonadecyl, eicosyl, heneicosyl and isomeric forms thereof.

The term "cycloalkyl" means the monovalent moiety obtained upon removal of a single hydrogen atoms from a cyclic hydrocarbon. Representative of cycloalkyl is cyclopropyl, cyclobutyl, cyclopentyl, cyclohexyl and the like.

The term "aryl" as used herein means the monovalent moiety obtained upon removal of a single hydrogen atom from a parent aromatic hydrocarbon. Representative of aryl are phenyl, naphthyl and the like.

Monocarboxylic acids employed in preparing the polyamide compositions of the invention are generally well known as are methods of their preparation. Representative of such monocarboxylic acids are formic, acetic, propionic, butyric, n-valeric, neopentanoic, hexoic, heptanoic, 3-ethylhexanoic, pelargonic, decanoic, undecanoic, dineopentylacetic, tridecanoic, myristic, pentadecanoic, hexadecanoic, heptadecanoic, palmitic, stearic, oleic, arachidic, behenic, benzoic, salicylic and like acids.

An essential reactant for preparing the compositions of the invention is a synthetic polymeric resin, having a crystalline chain structure. Such a resin, incorporated in the polyamide structure formed by polymerization of the above-described monomeric compounds with an organic diamine, lends crystallinity to the product compositions of the invention. This physical characteristic enhances fast drying of ink compositions which include the compositions of the invention in their make-up.

The resin components employed in the preparation of the polyamide compositions of the invention are also characterized as having functional groups (COOH or OH) able to react with other acid/amine groups present in the reaction mixture. Representative of such resins are copolymers of styrene or acrylate/methacrylate esters with acrylic, methacrylic, crotonic, itaconic acids; styrene-maleic anhydride copolymers, methyl vinyl ether-maleic anhydride copolymers, polyvinyl alcohol, ethylene-acrylic acid copolymers, styrene-allyl alcohol copolymers, esters of rosin-maleic anhydride adducts and the like. Preferably, the resins contain free carboxyl groups. Most preferred are styrene-acrylic acid copolymers.

The organic polyamines employed in preparing the compositions of the present invention may be one or more of the known aliphatic, cycloaliphatic or aromatic diamines such as those of the formula:

$$H_2N-R'-NH_2 \qquad (II)$$

wherin R' is an aliphatic, aromatic, or cycloaliphatic hydrocarbon radical; i.e., ethylene, hexamethylene, propylene, phenylene, xylene, cyclohexylene and the like.

Preferred are diamines of the formula (II) having from about 2 to 36 carbon atoms. Preferred especially are the alkylene diamines. Illustrative of the preferred diamines are ethylene diamine, 1,3-diaminopropane, 1,4-diaminobutane, terephthalyl diamine, known as p-xylene diamine, piperazine 1,6-hexamethylene diamine, 4,4'-methylenebis(cyclohexylamine), 2,2-di-(4-cyclohexylamine)propane, polyglycol diamines, isophorone diamine, isophthalyl diamine, known as m-xylene diamine, cyclohexanebis(methylamines), bis-1,4-(2'-aminoethyl)benzene, 4,4'-methylenebis(cyclohexylamine) and diamines of polymeric fatty acids. These diamine compounds are all prepared by well known methods and many are commercially available.

Another class of organic polyamines which may be employed in the preparation of the polyamides of the invention are polyamines of the formula:

$$H_2N[(R')_2NH]_n(R')_2NH_2 \qquad (III)$$

wherein R' is as defined above and n is an integer of 1–3, inclusive. Representative of preferred compounds of the formula (III) are diethylenetriamine (n=1), triethylenetetramine (N=2), tetraethylenepentamine (N=3) and the like.

Still another class of organic polyamines which may be used to prepare the compositions of the invention are the polyether amines such as the polyoxypropyleneamine products of the general structure:

$$H_2NCH(CH_3)CH_2[OCH_2CH(CH_3)]_xNH_2$$

i.e., Jeffamine products (Texaco) where
X=2.6, (Jeffamine D-230);
X=5.6, (Jeffamine D-400); and where
X=33.1, (Jeffamine D-2000).

In the preparation of the polyamide compositions of the invention, the reaction mixtures may also include a variety of inert, non-reactive ingredients such as antioxidants, slip agents and the like.

The technique and general method of polymerizing the mixed reactants described above is generally well known; see for example U.S. Pat. Nos. 3,484,339 and 3,377,303.

The polyamides of the present invention may be prepared by charging a resin kettle with the reactants, in the proportions as hereinabove described and heating the mixture to a temperatue at which polymerization occurs. In general, heating of the reactants is to a temperature of from about 130° to 160° C. to initiate polymerization, and thereafter at a temperature sufficient to distill off the water of condensation. Preferably, the heating is carried out under an inert gas atmosphere such as under a blanket of nitrogen gas. To assist the polymerization, a polymerization catalyst may be added in catalytic proportion. Representative of such catalysts are phosphoric acid. The heating of the reaction mixture may be carried out until a selected viscosity of the reaction mixture is reached, e.g. 1,000–100,000 cps at 195° C. and preferably 7,500–20,000 cps at 195° C.

The method of the invention may be carried out at atmospheric pressures. However, toward the end of the polymerization step it is advantageous to operate under a slight vacuum. This aids in removal of by-products, solvent and condensation water, unreacted diamine and in driving the polymerization to completion.

It is advantageous to include as a component of the polymerization reaction mixture, an antioxidant. Any of the well known antioxidants may be employed in conventional proportions, i.e., from 0.1 to about 2 percent by weight of the reactants.

As polyamide resins, the compositions of the invention generally possess the following physical characteristics:

| | |
|---|---|
| Softening Point (Ring & Ball), °C. | 105–115 |
| Acid Number | 50–60 |
| Gardner-Holdt Viscosity, 40% in 70/30, water/n-propanol | U–X |

The resin products of the invention may be used as the resin binder component in conventional printing ink compositions such as aqueous flexographic ink formulations. The resulting ink formulations are water-reducible, i.e., the ink can be diluted with water to very low concentrations of solids (less than 1%) without a cloudy or hazy mixture resulting.

The following examples and preparations describe the manner and process of making and using the invention and set forth the best mode contemplated by the inventor of carrying out the invention, but are not to be construed as limiting.

TEST METHODS

The test methods used for evaluating the polyamide compositions of the invention as aqueous ink components are as follows.

(1) Ball and ring softening points were determined by the test method described in ASTM test method 28–58T.

(2) Acid Values - acid numbers were determined by the method of ASTM-D 1980–61 employing n-butanol as the solvent.

EXAMPLE 1

A two liter four neck round bottom flask, fitted with a thermometer, mechanical stirrer, nitrogen inlet, collection trap and condenser was charged with the following reactants:

| Dimer Fatty Acid | 510 grams |
|---|---|
| Propionic Acid | 145 grams |
| Trimellitic Anhydride | 46 grams |
| Joncryl 678 (S. C. Johnson Co.; an acrylic resin with an acid number of 200) | 137 grams |

This mixture was heated to 80° C. and a mixture of the following diamines charged:

| Ethylenediamine | 66 grams |
|---|---|
| Isophoronediamine | 96 grams |

The reaction was heated to 200° C. as water was distilled out. After a one hour hold period at 200° C., a vacuum of about 10 mm was applied for thirty minutes. Vacuum was broken with nitrogen and Wytox 312 (nonyl phenyl phosphite) antioxidant and BYK 301 slip agent added. The reaction was cooled to 180° C. and discharged. The product had the following analysis:

| Softening Point (Ring & Ball ), °C. | 110 |
|---|---|
| Acid Number | 55 |
| Gardner-Holdt Viscosity, 40% in 70/30, water/n-propanol (pH adjusted to 8.5 with ammonia) | W |
| Water dilutability, % solids at haze 70/30, 40% varnish | infinite |

This polyamide is acid functional and becomes water dispersible upon neutralization.

EXAMPLE 2

Using the method and conditions of Example 1, supra the following composition was prepared:

| Dimer fatty acid | 239 grams |
|---|---|
| $C_{21}$ Diacid (Westvaco 1550) | 337 grams |
| Propionic acid | 155 grams |
| Isophthalic acid | 32 grams |
| Ethylene-acrylic acid copolymers (AC-5120, Allied Corporation; acid number 120) | 61 grams |
| Ethylene diamine | 74 grams |

This composition gave the following physical properties:

| Softening Point (Ring and Ball), °C. | 98 |
|---|---|
| Acid Number | 59 |
| Gardner-Holdt Viscosity, 40% in 80/20 Water/N—Propanol @ pH = 8.5 (Ammonia) | X-Y |

EXAMPLE 3

Using method and conditions of Example 1, supra the following composition was prepared:

| Dimer fatty acid | 231.4 grams |
|---|---|
| $C_{21}$ Diacid (Westvaco 1550) | 323.4 grams |
| Propionic acid | 123.6 grams |
| Adipic acid | 17.4 grams |
| Joncryl 678 (S. C. Johnson Co.) | 133.5 grams |
| Ethylene diamine | 74.8 grams |
| Isophorone diamine | 96.0 grams |

This composition gave the following physical properties:

| Softening Point (Ring and Ball) °C. | 129 |
|---|---|
| Acid number | 60.5 |
| Gardner-Holdt Viscosity, 40% in 80/20, Water/N—Propanol @ pH = 8.5 (Dimethyl amino ethanol) | W-X |

EXAMPLE 4

A lab scale aqueous flexographic ink was prepared from the polyamide of Example 1 supra. in the following manner:

To a Waring Blender was charged 22.5 grams of waterborne polyamide, 33.6 grams of water, 10.8 grams of n-propanol, 3.6 grams of ethanol and 2.0 grams of ammonium hydroxide (28° Baume). The components were mixed at high speed for 10–15 minutes to give a clear, particulate-free dispersion. To this dispersion was added 27.5 grams of titanium dioxide (American Cyanamid OR-580) and mixed an additional 15 minutes at high speed. The resulting ink was stable (no settling) and had a final pH of 8.5. This full strength ink was reduced to printing viscosity with additional water/alcohol solvent blend and applied to polyethylene film (corona discharge treated) with a conventional ink handproofer. The resulting print gave gloss, adhesion, block resistance, and opacity comparable to conventional alcohol inks based on solvent polyamides. Dry rate was slightly slower and cold water flexibility and adhesion somewhat poorer.

EXAMPLE 5

Using the ink preparation method of Example 4, supra, a white flexographic ink having an EPA emission compliant solvent blend (80/20, water/alcohol by weight) of the following composition was prepared:

| | |
|---|---|
| Polyamide of Example 3 | 20 grams |
| Water | 23 grams |
| N—Propanol | 2.3 grams |
| 2-Butanol | 1.6 grams |
| Ethanol | 2.3 grams |
| Ammonium hydroxide (28° Baume) | 0.75 grams |
| Dimethyl amino ethanol | 0.50 grams |
| Titanium dioxide (AC OR-580) | 30 grams |

This full strength; ink was then diluted with the same water/alcohol blend as in full strength formula to give a printing viscosity of 30 seconds on a No. 2 Zahn cup.

What is claimed:

1. The copolymer reaction product of:
   (A) 20 to 60 equivalent percent of a polymeric fatty acid;
   (B) 0 to 60 equivalent percent of a polycarboxylic acid selection from the group consisting of a tricarboxylic acid and a dicarboxylic acid;
   (C) 15 to 50 equivalent percent of a monocarboxylic acid; and
   (D) 5 to 25 equivalent percent of a synthetic polymeric resin having a crystalline chain structure, said resin having active carboxyl and/or hydroxyl groups capable of reaction with acid/amine groups; with
   (E) 50 to 80 equivalent percent of an organic polyamine.

2. The copolymer reaction product of claim 1 wherein said organic polyamine is a mixture of ethylene diamine and isophoronediamine.

3. An ink composition which comprises an aqueous dispersion of the copolymer of claim 1 and a pigment.

4. The copolymer reaction product of claim 1 wherein said dicarboxylic acid is provided by adipic acid and a $C_{21}$ diacid.

5. The copolymer reaction product of:
   (A) 20 to 60 equivalent percent of a polymeric fatty acid;
   (B) 0 to 60 equivalent percent of trimellitic anhydride;
   (C) 15 to 50 equivalent percent of propionic acid; and
   (D) 5 to 25 equivalent percent of a styrene-acrylic acid copolymer resin having a crystalline chain structure and active carboxyl groups and/or hydroxyl groups capable of reaction with acid/amine groups; with
   (E) 50 to 80 equivalent percent of an organic polyamine.

* * * * *

UNITED STATES PATENT AND TRADEMARK OFFICE
CERTIFICATE OF CORRECTION

PATENT NO. : 4,514,540
DATED : April 30, 1985
INVENTOR(S) : Michael C. Peck

It is certified that error appears in the above-identified patent and that said Letters Patent is hereby corrected as shown below:

Col. 3, line 65; - "m-xylene" should read -- m-xylene --

Col. 6, last line of Example 2 has been omitted, please insert as line 13 --

Isophorone diamine        102 grams --

Col. 7, line 5 of claim 1 - "selection" should read

-- selected --

Signed and Sealed this

Twenty-seventh Day of August 1985

[SEAL]

Attest:

DONALD J. QUIGG

Attesting Officer          Acting Commissioner of Patents and Trademarks